United States Patent [19]
Van Der Burgt et al.

[11] 3,752,526
[45] Aug. 14, 1973

[54] VEHICLE BED

[76] Inventors: Gerrit Johan Van Der Burgt, Hoflandstraat 35; Johannes 'T Hart, Vuurdoornlaan 39, both of Pijnacker; Jacob Schrier, Iependaal 188, Rotterdam, all of Netherlands

[22] Filed: June 15, 1971

[21] Appl. No.: 153,190

[30] Foreign Application Priority Data
June 16, 1970 Netherlands................ 70/08762

[52] U.S. Cl. .............................................. 296/19
[51] Int. Cl. ............................................ A61g 3/00
[58] Field of Search .................................. 296/19

[56] References Cited
UNITED STATES PATENTS
2,324,685  7/1943  Ekman.................... 296/19

FOREIGN PATENTS OR APPLICATIONS
101,346  4/1941  Sweden.................... 296/19
859,982  1/1961  Great Britain............ 296/19

Primary Examiner—Philip Goodman
Attorney—Cushman et al.

[57] ABSTRACT

A vehicle bed comprises a platform for carrying a lying person, e.g. a patient, a maximum shock insulation being contemplated, which is obtained by a mass-spring system for the platform having a very low natural frequency of approximately 0.5 Hz, the platform being fixed against horizontal displacement by fixing means which act in the centre of gravity of the carrier platform loaded with a person.

11 Claims, 6 Drawing Figures

VEHICLE BED

The invention relates to a bed for vehicles comprising a platform for carrying a lying person and a spring frame for springing the platform in relation to the vehicle.

Such a bed is known.

During the transport of lying persons, e.g. patients in ambulances or driver's mates in trucks, an insulation which is basically active over a large frequency range of the transmitted vibrations is only possible if the support is effected by means of a spring system having a sufficiently low natural frequency in comparison with the major natural frequencies of the vehicle.

The invention provides a vehicle bed with quite reasonable shock insulation while, in spite of a low effective spring rigidity acting on the platform, it is nevertheless stable with respect to both horizontal movements and rolling and pitching movements in that the platform is fixed in horizontal direction relative to the vehicle through retaining means acting on the platform substantially on the level of the centre of gravity of the platform loaded with a person.

With normal road vehicles the springing of the shafts and wheels comprises the resiliency of the pneumatic tyres and the main springs under the vehicle body. Undamped there are at least four natural frequencies of the masses of axles and wheels on the tyres and springs (order of magnitude 7 – 12 Hz) and two of the vehicle body on the main springs, namely, in the main a translation of the centre of gravity (natural frequency 1 – 3 Hz) and a rotation approximately about the cross axle through the centre of gravity of the vehicle body with natural frequencies also ranging between 1 and 3 Hz.

When travelling on uneven roads, the vehicle body is so strongly excited to move in these frequency ranges that the motion amplitudes and the accelerations associated therewith have to be restricted through dampers disposed between the wheels and the body. In practice all motorcars travelling on bad road surfaces show high amplitudes of motion in the frequency bands around the natural frequencies of the vehicle, as determined by the spring rigidities and masses of said vehicle.

The principles of the insulation of vibrations teach that a spring-supported mass will only then show a reduced amplitude, in comparison with the vibration imposed, if the natural frequency of the mass spring system is less than ½ √2 of the imposed frequency. In case of road vehicles that may show great amplitudes at the lowest natural frequency (1 – 3 Hz), this implies that a spring support, e.g. a platform for the transport of patients, must have natural frequencies decreasing to e.g. 0.5 Hz.

A satisfactorily functioning additional spring system for shock insulation in road vehicles would require a static stroke of the springs under the weight acting thereon to a maximum of approximately 100 cm. If such a spring system is to function equally well for persons of varying weights, the spring element should be a re-adjustable spring with, in case of a variable load, constant natural frequency, e.g. a gas spring, but also steel springs in appropriate array can offer such possibilities. A spring system of this low natural frequency, when tested in commercial cars riding on bad roads, appeared to function properly at approximately 20 cm of movement possibility to the highest and lowest position of the sprung load in mid-position, i.e. approximately 40 cm stroke in all. This comparatively large stroke brings with it that the re-adjustable spring element will have to act on the mass through a mechanical advantage, as such a large stroke entails problems with springs.

The figures show some embodiments of vehicle beds according to the invention.

Figure 1:
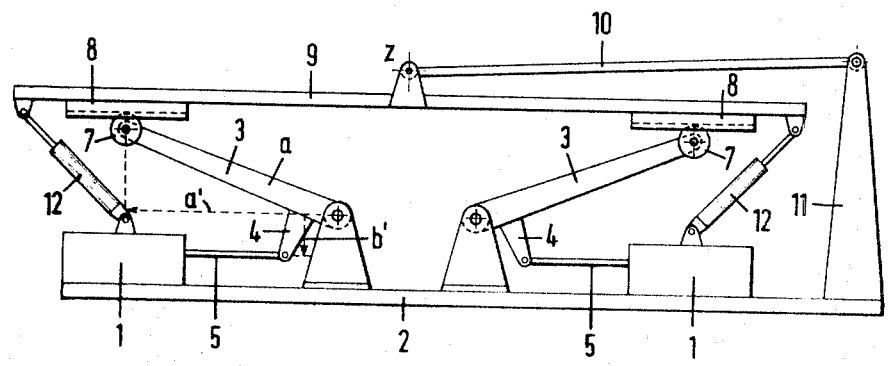
FIG. 1 is a schematic side elevation view of a vehicle bed embodying this invention.
Figure 2:
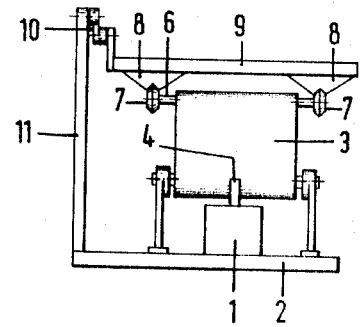
FIG. 2 is a front view of the bed shown in FIG. 1.

FIGS. 1 and 2 respectively shown a side view and a front view of a vehicle bed according to the invention, two identical re-adjustable spring elements 1 being attached to a bottom plate 2 to be mounted on the bottom of a vehicle. Pivoted to said bottom plate 2 are two levers with horizontal carrier arms 3. These two levers are provided with shorter auxiliary arms 4, the ends of which are connected with draw links 5 to spring elements 1. The carrier arms 3 carry at their free ends a shaft 6 mounting rollers 7 which are profiled in cross-section. Rollers 7 move in a negative profile track 8 which is attached to the carrier platform 9. Said platform 9 may be suitable for mounting a stretcher for the transport of patients or may be the bed of a driver's mate in a truck. At one or both sides of platform 9 there is provided a pivoting reaction rod 10 which is also pivoted to a bracket 11 of the bottom plate 2, which may or may not be sprung in the longitudinal direction, or a different fixed point of the vehicle. Disposed between bottom plate 2 and platform 9 are shock absorbers 12. The Figure shows two pneumatic telescopic absorbers 12. The required shock absorption can however, also be provided for in a different manner, e.g. in the spring elements.

The construction according to the invention functions as follows:

The effective spring rigidity at a specific adjustment of the spring elements 1 is strongly reduced by the ratio $a'/b'$ of the moment arms of the levers 3 and 4, wherein:

$a'$ = the horizontal projection of the distance $a$ between the pivots of lever 3

$b'$ = the vertical projection of the distance $b$ between the pivots of lever 4, so that at rollers 7 a low effective spring rigidity acts on platform 9. By this the natural frequency for translation springing is determined. The natural frequency for a rotation movement can then no longer be affected by the spring rigidity but is determined by the distance chosen between the rollers of the two arms and the mass distribution of the carrier platform 9. This then leads for the contemplated low frequency to rather short arms, as a result of which a vertical spring movement is accompanied with rather great relative displacements of the ends of the carrier arms along the platform, which movement is taken up by the rollers as an appropriate means occupying little space. Lateral forces on platform 9 are conducted via the negative profile of guide track 8 and the roller profiling on the carrier arms (FIG. 2) and via the pivots to the bottom plate 2.

If longitudinal forces act on platform 9, as is the case in an arrangement in longitudinal direction in a vehicle during braking or accelerating or on slopes, these are taken up by reaction rod 10. Rod 10 is disposed horizontally in the mid-position of the re-adjustable spring element and approximately at the level of the centre of gravity z of the carrier platform and load, so as to prevent the platform from making tilting movements in case of longitudinal forces.

Figure 3:
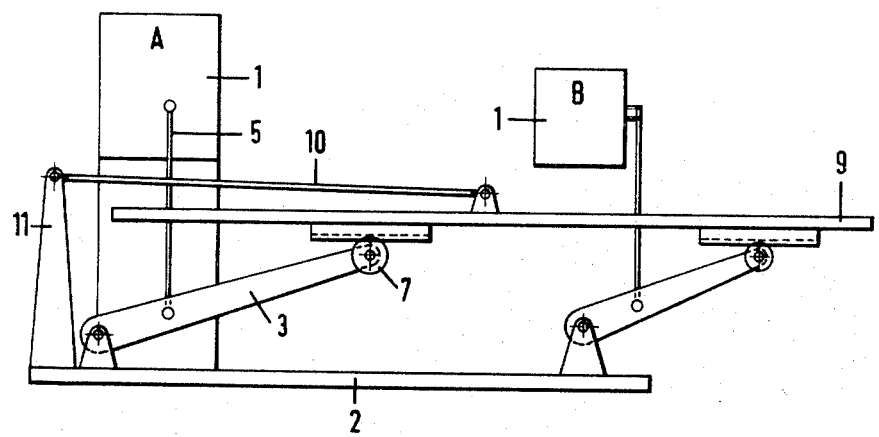
FIGS. 3 and 4 are views corresponding to FIGS. 1 and 2, respectively, but showing a modified form of the invention.
Figure 4:
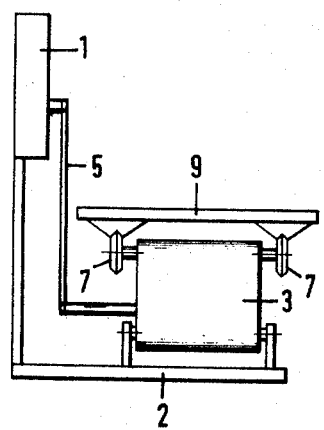

FIGS. 3 and 4 show in side and front view a different solution for the platform springing, this time with unequal spring elements 1. The spring element A acts on a roller which acts substantially under the centre of gravity of the loaded carrier platform, so that element A carries virtually the entire weight.

Spring element B determines the horizontal position of the platform and the frequency of the rotary movement. Spring elements A and B are disposed at one side of platform 9 and connected to the auxiliary levers via pull rods and push rods. The reference numerals of the various parts are equal to those of FIGS. 1 and 2.

Figure 5:
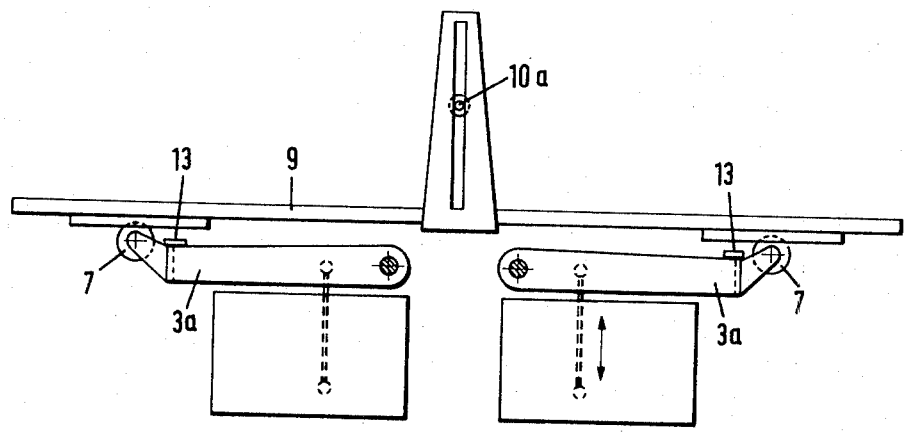
FIGS. 5 and 6 are views corresponding to FIGS. 1 and 2, respectively, but showing another modified form of the invention.

FIG. 5 depicts a side view of a platform suspension from arms 3a which are adapted to make an oscillatory movement beside the platform 9, e.g. along a wall. All elements, as in FIGS. 1, 2, 3 etc., are present, except the reaction rod 10, for which in this case use has been made of a roller in a groove 10a.

Figure 6:
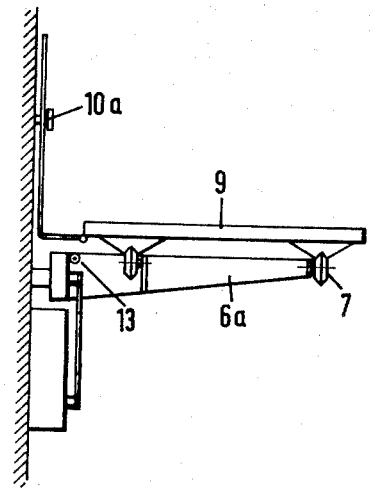

It appears in FIG. 6 that the platform is collapsible when out of use by applying a pivot 13 in the support 6a of the rollers at the ends of the carrier arms.

When use is made of the spring-supported platforms as shown in the Figures the spring elements, after loading, must first be so tensioned by means of an external energy source that the platform, in view of the road to be used and the construction of the vehicle on which the platform is mounted, can make a sufficient upward and downward spring movement.

In a practical embodiment, for instance adjustment of the spring elements with a push-button operated electromotor with automatic disconnection after sufficient working height has been attained, has been found satisfactory.

We claim:

1. A bed for use in a vehicle comprising:
   platform means for carrying a person in a reclining position,
   horizontal retaining means for preventing substantial movement of said platform in a horizontal direction and attached to said platform in such a manner as to be acting thereon substantially at the level of the center of gravity of said platform loaded with a person,
   adjustable spring means for resiliently supporting said platform in a substantially horizontal position in such a manner that the natural frequency of vibration of said platform while loaded and said spring means is less than the lowest natural frequency of a vehicle upon which it is mounted, and which spring means may be independently adjusted so as to functionally dispose said platform while loaded, in an inclined position.

2. A vehicle bed according to claim 1, characterized in that the retaining means are formed by a linkage system extending substantially in the horizontal plane through the centre of gravity of the carrier platform loaded with a person.

3. A vehicle bed according to claim 1, characterized in that the retaining means are formed by guide means secured to the platform and extending substantially in the horizontal plane through the centre of gravity of the platform when loaded with a person, said guide means being guided along vertical guideways.

4. A bed as defined in claim 1 attached to a vehicle.

5. A vehicle bed according to claim 1, characterized in that the natural frequency of the mass-spring system, the mass being formed by the platform loaded with a person and the spring system by said adjustable vertical spring means is in the order of 0.5Hz.

6. A vehicle bed according to claim 1 characterized in that the spring means includes a set of levers which each act with a horizontal arm on the platform and with an arm shorter than said horizontal arm.

7. A vehicle bed according to claim 6, characterized in that the horizontal arms of the set of levers act on profiles of the carrier platform by means of profiled rollers.

8. A vehicle bed according to claim 1, characterized by mounting means for attaching thereto the spring means along the wall of a vehicle and by levers whose horizontal arms each have a free end in the form of a bracket, extending transversely to the vehicle wall.

9. A vehicle bed according to claim 7, characterized in that the free end of each horizontal arm carries the profiled rollers.

10. A vehicle bed according to claim 8, characterized in that the free ends of the horizontal arms of the levers are slewable about a longitudinal axis of the vehicle between a vertical rest position and a horizontal operating position.

11. A vehicle bed according to claim 1, characterized in that the effective spring rigidity acting on the carrier platform is adjustable so as to adapt same to the weight of a person lying on the carrier platform.

* * * * *